Dec. 31, 1929.    G. A. SCHETTLER    1,741,438

FRICTION CLUTCH

Filed Aug. 10, 1925

Inventor
Gustav A. Schettler
By his Attorney
Nelson M. Howard

Patented Dec. 31, 1929

1,741,438

UNITED STATES PATENT OFFICE

GUSTAV ADOLF SCHETTLER, OF BRAMLEY, ENGLAND, ASSIGNOR TO THE TURNER TANNING MACHINERY COMPANY, OF PORTLAND, MAINE, A CORPORATION OF MAINE

FRICTION CLUTCH

Application filed August 10, 1925, Serial No. 49,311, and in Great Britain May 2, 1925.

This invention relates to friction clutches and is illustrated as embodied in a friction clutch of the type in which a deformable friction ring is used as a gripping device to connect a driving and a driven member. It is an object of the invention to provide an improved clutch of this type having a rugged construction which will be especially suitable for heavy duty machines such as, for example, certain machines used in the tanning industry.

In the use of prior constructions of this character considerable objectionable friction has been encountered in deforming the friction ring to a gripping position, because a radially movable member with a wedge-shaped end has been used to slide on a correspondingly wedge-shaped abutment on the friction ring and so wedge the ring into clutch engaging position. This friction has a radial component which tends to force the ring out of co-axial relation with the member it is arranged to grip and thereby causes an excessive and uneven wear of these parts.

In order to overcome the above mentioned objections, a feature of the invention consists in interposing an antifriction toggle link between the friction ring, which is preferably resilient, and the radially movable member that operates it. In this manner, unnecessary friction in this portion of the controlling mechanism of the clutch is eliminated so that the mechanism is made to operate easier. The illustrated toggle link is so arranged that, when the clutch is in engaged or operative position, the thrust of the link against the friction ring is, or may be adjusted to be, tangential to the ring, without any radial thrust to produce uneven wear. This adjustment is also such as to maintain the clutch parts in engaged position and lock them against disengagement.

Other features of the invention will be apparent from the following description when considered in connection with the accompanying drawings, in which, Figure 1 is a cross section taken along the line 1—1 in Fig. 4, looking in the direction of the arrows and showing the clutch in engaged or operative position;

Figure 5:
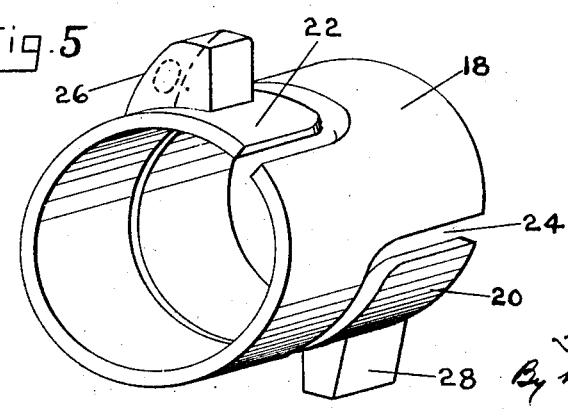
Fig. 5 is a detail of construction showing the preferred, double coil contractible friction ring.

In the illustrative construction shown in the drawings, as will be explained, the clutch is arranged as a means for connecting and disconnecting a shaft 10 with a gear 12, either of which may be used as the driving member. Mounted on the shaft is a clutch box 14 which is secured thereto by set screws 16. Within the clutch box is a contractible friction ring 18 shown in detail in Fig. 5. Preferably and as illustrated, this ring consists of two convolutions 20 and 22 separated by a continuous groove 24 of such a width as to permit contraction of each convolution in order that the inner surface of the ring may firmly grip the outer surface of a sleeve attached to or integral with the gear 12 and thereby drive the mechanism which is controlled by the clutch without slipping, as will be more fully described later. The continuous groove 24 extends longitudinally from one end of the ring to its middle, then circumferentially for approximately three-quarters of the way around the ring and then longitudinally to the opposite end of the ring. Near the free ends of the convolutions are projecting lugs or abutments 26 and 28, which serve to receive the pressure for contracting the ring, as will later be explained.

For controlling the clutch, a collar 30 is slidingly mounted upon the shaft 10. This collar is provided with a circumferential groove 32 by which it may be slid along the shaft by the usual operating yoke (not shown) having rolls which run in the groove. The collar 32 is provided with a pivot screw 34 upon which a link 36 is mounted. This link 36 is connected by a pivot 38 to one arm 40 of a bell crank lever. The other arm 42 of the bell crank lever extends within the clutch box, the bell crank lever 40, 42 being pivotally mounted on the box at 44. It will be seen that, by moving the collar 30 longitudinally of the shaft, the outer end of the arm 42 of the bell crank lever is moved in a substantially radial direction either toward or from the shaft so as respectively to contract or to permit expansion of the friction ring 18. The arm 42 of the bell crank lever is thus a radially movable member for operating the friction ring and deforming it and, in the illustrated construction, specifically, for contracting it.

Figure 1:
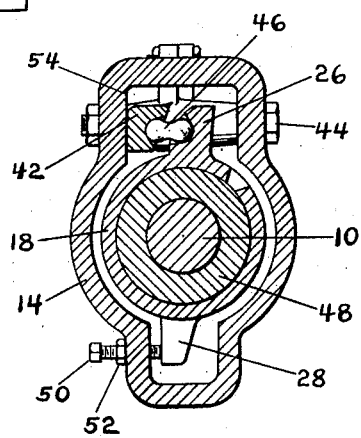
Figure 2:
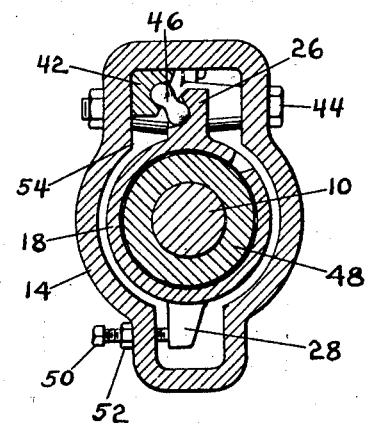
Fig. 2 is a cross section taken along the line 2—2 in Fig. 3, looking in the direction of the arrows and showing the clutch in disengaged or inoperative position.
Figure 3:
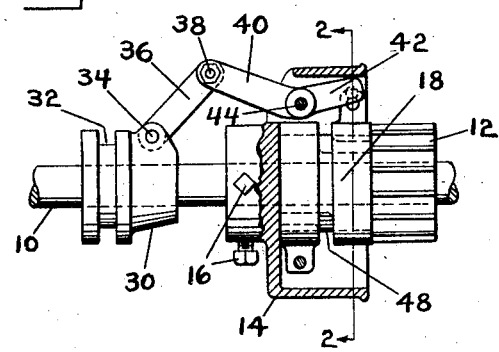
Fig. 3 is a side elevation, partly in section, showing the clutch in inoperative position.
Figure 4:
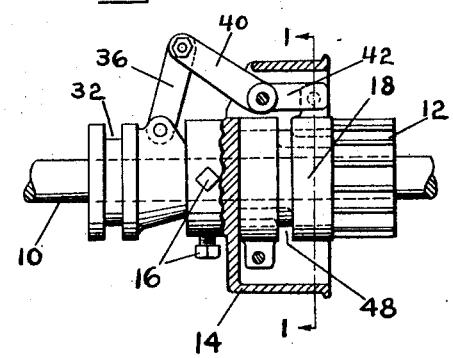
Fig. 4 is a view similar to Fig. 3 but showing the clutch in engaged or operative position.

An anti-friction toggle link 46, preferably dumb-bell shaped, is interposed between the arm 42 of the bell crank lever and the lug 26 of the friction ring, being arranged to operate in a plane substantially parallel to the pivot 44. This toggle link is provided with spherical ends which are seated, respectively, in spherical recesses in the bell crank arm 42 and lug 26. The toggle link is thus held in position without any additional retaining means. When the arm 42 is in the position shown in Fig. 2, the friction ring is open but when the arm 42 is moved radially so that the toggle link 46 assumes a position tangential to the ring 18 as shown in Fig. 1, the ring is contracted and engages a sleeve 48 which may be integral with the gear 12 or securely attached thereto. In order to produce the proper friction on the sleeve 48, an adjusting screw 50 passes through the clutch box 14 and is set up against the lug 28 on the friction ring until the desired friction is obtained when the toggle link is brought into a position tangential to the friction ring, this being the engaged or operative position of the clutch. The adjusting screw is then locked in position by the check nut 52. If the parts should wear, the adjusting screw 50 provides a ready means for taking up such wear.

It will be noted that, with the toggle link 46 in the tangential position shown in Fig. 1, all radial thrust is removed from the friction ring and a possible source of wear eliminated. It will be further noted that the end of the bell crank arm 42 is supported on the inner surface 54 of the clutch box 14, thereby eliminating side strain on the pivot 44 to which the toggle link 46, when in its tangential position, is parallel. Furthermore, when the toggle link is in tangential position, the thrust of the link on the bell crank arm 42 is perpendicular to the surface 54 of the clutch box so there is no tendency to move the bell crank arm 42. Accordingly, the clutch is locked in closed position and will remain so without any strain being exerted on the parts to maintain it in that position, until the collar 30 is operated.

It will also be noted that in applicant's construction, even if it is necessary to make the lever 40 of considerable weight in order to give it strength in a heavy duty machine, it will be held in position against centrifugal force by the link 36 because the collar 30, to which the link is connected, will be held by the usual yoke through the engagement of its rollers with the groove 32 in the collar. The position of the yoke (and the corresponding position of the collar and the clutch operating member) will be controlled by the operator by means of a foot treadle or similar device. In this manner the liability of the clutch to chatter due to the action of centrifugal force in causing partial engagement is obviated and this portion of the clutch mechanism is easily operated because the sliding friction in the prior constructions between the collar 30 and lever 40 is replaced by the link 36 and its pivoted connections.

Although the invention has been described as embodied in a clutch having a contractible, resilient friction ring, it is not limited to such a construction since in various aspects it is within the scope of the invention to employ other types of deformable friction rings.

Having described my invention, what I claim as new and desire to secure by Letters Patent of the United States is:

1. In a clutch mechanism, a friction ring of more than one turn, a pivot fixed relatively to the ring, a member mounted on said pivot and radially movable toward and away from the longitudinal axis of the ring for deforming the turns of the ring, and a toggle link interposed between the ring and said member.

2. In a clutch mechanism, a friction ring, a pivot, a lever mounted on the pivot, a toggle link interposed between the lever and ring, and an abutment for the lever opposite the toggle link whereby the pivot is relieved of side strain as the lever is moved.

3. In a clutch mechanism, a resilient friction ring, a member for contracting the ring, a pivot shaft for said member, sockets in the ring and said member, and a toggle link interposed between the ring and said member and arranged to operate in a plane substantially parallel to said pivot shaft, the ends of the link being held in said sockets without any additional retaining means.

4. In a clutch mechanism, a friction ring, a pivoted lever for deforming the ring by acting on one end thereof, a toggle link interposed between the ring and said member, and means for adjusting the position of the opposite end of the ring whereby the toggle link may be positioned, when the clutch is in full engagement, tangentially to the ring.

5. In a clutch mechanism, a shaft, a friction ring, a member for deforming the ring, a pivotal support for said member, a sliding collar on the shaft, connections between the collar and said member for operating the member, and a dumb-bell shaped toggle link connected to said member and engaging said ring, said toggle link being arranged to operate in a plane substantially parallel to said pivotal support.

6. In a clutch mechanism, a clutch box, a resilient friction ring within the box, a lever pivoted on the box for contracting the ring, a toggle link interposed between the ring and said lever, and an abutment on the clutch box for one side of the lever adjacent its end, all relatively constructed and arranged so that, when the clutch is in full engagement, the thrust from the ring through the toggle and side of the lever is perpendicular to the abutment, whereby the clutch is locked in gripping position.

In testimony whereof I have signed my name to this specification.

GUSTAV ADOLF SCHETTLER.